Patented Aug. 10, 1943

2,326,348

UNITED STATES PATENT OFFICE 2,326,348

ENAMELING COMPOSITION AND THE LIKE AND METHOD OF MAKING THE SAME

Leon J. Frost and Charles H. Commons, Jr., Niagara Falls, N. Y., assignors to The Titanium Alloy Manufacturing Company, New York, N. Y., a corporation of Maine No Drawing. Application August 31, 1939, Serial No. 292,874

8 Claims. (Cl. 106—48)

This application is a continuation-in-part of copending application Serial No. 127,406, filed February 24, 1937.

This invention relates to vitreous enamels and the like of high opacity and relatively white in color, and to the method of producing the same. More particularly, it relates to such enamels and the like containing zirconium compounds as opacifiers.

In the manufacture of enamels for application to metal bases, and to a somewhat lesser extent to ceramic bases, the customary procedure is to mix predetermined amounts of various materials into a fairly homogeneous mass and charge this batch into a preheated smelter. Heat is applied until the reactions have proceeded to a point where the mass becomes a smooth liquid which is generally a fairly uniform suspension of undissolved opacifier in a molten glass. This molten material is poured into a suitable container of water to quench it and make the mass friable so as to grind more easily in subsequent operations. After drying this "frit" it is charged into ball or pebble mills, with or without water, and other materials, depending on the class of ware to be made and the particular process to be used. Dry process enameling is used on heavy cast iron articles which hold considerable heat. For this process the frit is milled dry with not more than about 3% opacifier until the material is fine enough to be easily shaken through a sieve onto the hot ware where it fuses onto the metal, due to the retained heat of the latter.

The more general process, which is necessary for lighter weight ware, is known as the "wet process." In this process the frit, together with water, clay, opacifier, color and electrolyte (if any) are charged into a mill and ground to suitable fineness for satisfactory handling and application. The slip thus formed is either sprayed onto the ware or the ware dipped into the slip and the excess enamel either drained or shaken off. The ware is allowed to dry by evaporation of the water and is then put into a suitable furnace and fired for a time and at a temperature necessary to melt the glass and have it adhere firmly to the ware. Usually, a colored ground coat is first employed to promote adhesion and to prevent the reduction of the opacifier (or other constituents) in the enamel by the metallic base. After firing the ground coat, the process is repeated with the cover coat. One, two or even three cover coats may be applied depending on the properties of the enamel, etc. When finished, the enamel imparts color, hardness and surface to the ware, while the metal base imparts strength to the hard but somewhat brittle glass coating.

It is thus seen that an opacifier is included in the raw frit batch, and in addition more opacifier may be added "at the mill." As the opacifier in such enamels, either tin oxide or antimony oxide (or its compounds, such as sodium antimonate) have been extensively used. Both these materials are relatively insoluble in the glass melt, opacity thus resulting from diffuse reflection of incident light from the suspended particles of opacifier. Both materials, however, suffer from the disadvantage that they are readily reducible to dark-colored materials (sub-oxide or metal) which in most cases are undesirable. In addition, antimony oxide, though less expensive than tin oxide, is quite poisonous. To overcome these disadvantages, zirconium oxide has been suggested as an opacifier. However, because of its relatively high solubility in the glass, so much of it was necessary that its cost was equal to or greater than that of antimony oxide when used in the frit. It found considerable usefulness as a mill addition opacifier because in the short firing time of the enamel on the ware (two to five minutes compared to one to three hours in the smelter) not very much of the zirconium oxide had time to go into solution in the glass and thus satisfactory and economical results were obtained. It was therefore a useful mill addition opacifier for use with frits containing variable amounts of tin oxide or antimony oxide opacifier.

Attempts have also been made to employ zirconium oxide as a frit opacifier. Mere "loading" of the frit with zirconium oxide is objectionable not only because of the increased cost, but also because the refractoriness of the zirconium oxide increases the difficulty of handling. Other compositions have been suggested in order to produce high opacity in the frit, as exemplified by U. S. Patents Nos. 1,848,567 and 1,944,938. Most of these compositions, however, suffer from the disadvantage that accurate control of the smelting temperature is necessary to keep the opacifier crystals from going into solution in the glass. These compositions were also objectionable because of their higher cost and lack of chemical durability, although they were satisfactory as regards opacity, gloss and irreducibility.

It is therefore an object of this invention to produce enamels and the like of high opacity at relatively low cost. It is another object to produce such enamels having good gloss and chemical and mechanical durability. It is another object to provide methods of forming enameling compositions which can form highly opaque enamel coatings with relatively thin coatings. Other objects will appear hereinafter.

These objects are accomplished by means of a frit of low opacity, said frit containing a certain quantity of an aluminum compound, together with a zirconium compound and a fluorine compound, with other preferred additions and procedures as more fully pointed out hereinafter.

Hitherto, most efforts have been concentrated in the direction of securing greater opacity in the frit. It has now been found that, under certain conditions, high opacity in the frit is neither necessary nor desirable. If a frit is made with zirconium compounds in a suitable frit compositions, such compounds may, in accordance with the present invention, go into solution in the melt. By adding a seeding agent, such as a zirconium compound, at the mill, the zirconium compound in the frit can be made to reprecipitate in the enameling operation to form a densely opaque enamel. The frits produced by this method are so translucent and lack so much opacity, when considered in the light of present practice, that they would normally have been discarded as worthless without expending the effort of trying them as enamels. However, when properly compounded and suitably seeded they have been found to produce very densely opaque enamels on the ware. The results of the work along this line have produced enamels of such outstanding merit that it is believed they meet the requirements of the enameling and glazing industry for which a solution has long been sought.

In order to secure, in accordance with this invention, a highly opaque enamel from a frit which is relatively translucent, the composition of the frit should be kept within certain limits. The important ingredients of the frit are aluminum, zirconium and fluorine, present in the composition in the form of compounds of these elements. The quantity of zirconium should be 1% to 9%, and preferably 5% to 9%. Similarly, the amount of aluminum should exceed 5%, and for best results should lie between 6% and 10%. When it is present in lesser quantities than this it becomes very difficult or impossible to secure good opacity from relatively transparent frits, without abnormally high mill opacifier additions. The quantity of fluorine should be 3.5% to 15%, and preferably 7% to 14%.

The zirconium compound utilized in this connection is preferably zircon, since this occurs naturally in a relatively pure form and needs no chemical transformation to prepare it for use. Other zirconium compounds, however, may also be used, particularly those which do not undergo chemical change when subjected to the high temperatures employed in baking or firing the enamels. Among such compounds are zirconium oxide, calcium zirconium silicate, sodium zirconium silicate, zinc zirconium silicate, and others. It is necessary only that such zirconium compounds do not contain any appreciable quantities of the elements which are harmful in the frit formulation, as hereinafter pointed out.

It has been found that the occurrence of certain elements in the present type of frit produces undesirable results. The undesirable impurities are iron, chromium, copper, manganese, vanadium, nickel and, to a lesser extent, titanium. These elements vary in the harmful effect which they produce, but in general the quantities should be kept below the following maxima:

$Fe_2O_3$ _____ Below 0.08  $MnO_2$ _____ Below 0.03
$Cr_2O_3$ _____ Below 0.005  $V_2O_5$ _____ Below 0.005
$CuO$ _____ Below 0.01  $Ni_2O_3$ _____ Below 0.01

In some cases, also the presence of excessive amounts (e. g. above 0.3%) of titanium oxide, particularly in the form of rutile, is undesirable.

The presence of many of these impurities, however, is only harmful when it is desired to produce an opaque enamel of a high degree of whiteness. When producing colored enamels, in fact, it may even be desired to add the oxides of one or more of these otherwise undesirable elements. The invention also contemplates the manufacture of colored enamels in addition to white enamels.

Where whiteness is desired, however, the aluminum compound should be relatively free from the above impurities. Any suitable chemically purified material, such as alumina hydrate, can be used. It is preferred, however, to use certain naturally occurring aluminum containing minerals which are available in a sufficient state of purity for this use. By far the best of such minerals is pyrophyllite, which is cheap, easily available and very pure. Other materials, however, can also be used. Among these are naturally occurring sillimanite or andalusite, partially purified by leaching with dilute hydrochloric acid, a highly purified grade of English china clay, and topaz, bauxite or kyanite, if available in a sufficiently pure state. Suitable samples of these naturally occurring materials show percentages of undesirable impurities as shown in Table I.

TABLE I

|  | Pyrophyllite | Sillimanite acid leached | Andalusite acid leached | English china clay |
| --- | --- | --- | --- | --- |
| $Fe_2O_3$ | 0.012 | 0.20 | 0.6 | 0.20 |
| $Cr_2O_3$ | Trace | 0.005 | Trace |  |
| $CuO$ | 0.01 | None | None | 0.001 |
| $MnO_2$ | Trace | Trace | Trace | 0.01 |
| $V_2O_5$ | 0.005 | 0.01 | 0.02 |  |
| $Ni_2O_3$ | Trace | 0.005 | 0.005 |  |
| $TiO_2$ | 0.2 | 0.8 | 0.9 | 0.05 |

As mentioned above, however, pyrophyllite is the preferred material. Not only is it cheaper, but it produces better results. The mineral pyrophyllite is soft and resembles talc in appearance. It has the mineralogical composition of approximately $Al_2O_3.4SiO_2.H_2O$, and is optically negative with B axis perpendicular to the nearly perfect basal cleavage plane.

The fluorine compound can be in the form of naturally occurring materials, such as cryolite or fluorspar, or synthetic materials such as sodium fluosilicate.

In addition to zirconium compounds, aluminum compounds and fluorine compounds, it is desirable to incorporate in the frit certain other materials. Boron, in the form of boric oxide or borax is desirable. Silicon is usually present in the form of the silicates of zirconium and aluminum, but it may be desired to add further silicon in the form of quartz. Other desired materials are calcium (added, for example, in the form of limestone or fluorspar), sodium (added, for example, in the form of sodium nitrate or cryolite) and sometimes zinc oxide. In place of the sodium, other alkali metals, such as lithium or potassium may be used. Barium or strontium compounds may partially replace the calcium compounds. Except for aluminum, zirconium and fluorine, these compounds are in general incorporated in the frit for purposes other than securing opacity in the final enamel. The preferred quantities of these materials are as follows: sodium (or other alkali metal) 1% to 16% (more preferably 7% to 13%), boron 1% to 8% (more preferably 3% to 7%), silicon 8% to 26% (more preferably 12% to 22%), and calcium 1% to 15% (more preferably 2% to 9%).

The physical form of the various ingredients is not a necessary feature of this invention. However, is is preferred that they be in a relatively finely divided form, in order that the smelting time may be as low as possible. This is particularly true of the more refractory ingredients. For example, it is preferred to use finely milled zircon rather than granular zircon, although the latter can also be used.

After the raw frit batch is compounded it is smelted at a relatively high temperature, such as in the neighborhood of 2000° F. As distinct from prior frits containing zirconium compounds as an opacifier, it is not necessary that the smelting temperature be so accurately controlled. The reason for this is that securing opacity in the frit is neither desirable nor undesirable. However, there must be sufficient control to avoid loss or destruction of enamel constituents.

After the frit is formed it is quenched in the customary fashion. It is then milled with a minor quantity of a zirconium compound opacifier, such as zirconium oxide, for example 3 to 10 parts of zirconium oxide per 100 parts of frit or other suitable seeding agent, together with other desired constituents such as clay, magnesium carbonate or sodium nitrite, and water to secure proper consistency. It is then applied to the finished article and fired at an elevated temperature in well-known fashion. Surprisingly enough, the resulting enamel exhibits high opacity, evidently due to the fact that the opacifier added at the mill "seeds out" or precipitates the opacifier incorporated in the frit.

Having described the invention, the following examples are now given. The compositions given in these examples show the types of frit compositions which have been tried and found valuable for this purpose. In some cases the types represent the extremes in compositions while others are the preferred compositions found to be the most practical. In each case the ingredients may consist of various combinations of compounds so as to give the desired final compositions. Where the minerals pyrophyllite, sillimanite, andalusite or English china clay are specified in the examples, it is understood that specimens approximating the compositions shown in Table I were used.

In the enameling art two or more types of instruments are used to evaluate the quantity of light reflected from an enameled surface, and to more accurately judge "opacity" than was possible by eye alone. The Hunter instrument is so constructed that it separates diffuse reflection and specular reflection and evaluates them separately. This is advantageous for research work, as the diffuse reflection is the real basis for white opacity or hiding power. However, the Bausch and Lomb instrument integrates the diffuse reflection plus a component of specular reflection and produces a higher reading, but one which is more in line with what the human eye sees under normal types of illumination. Accordingly, the reflectance readings given in the examples are with the Bausch and Lomb instrument. The Hunter readings will be generally about 4 to 4½ points lower, depending on the exact specular reflection of the particular sample being measured.

EXAMPLE 1

*Ingredients of raw batch (parts by weight)*

| | |
|---|---|
| Zirconium oxide | 8.00 |
| Quartz powder | 30.42 |
| Borax—dehydrated | 28.91 |
| Sodium nitrate | 3.23 |
| Fluorspar | 5.00 |
| Limestone | 7.68 |
| Cryolite | 12.00 |
| Aluminum hydrate | 21.53 |

This batch was mixed and then smelted at a temperature of 1900° F. to form a melt, which was then poured into water and quenched. 100 parts of this frit was milled with 6 parts of clay, 6 parts of zirconium oxide, 0.25 part of magnesium carbonate and about 40 parts of water to a fineness of plus 200 mesh. The slip thus formed was applied by spraying to sheet iron, previously supplied with a ground coat, at the rate of 72 grams per sq. ft. total for two coats. After firing at 1500° F. for 2½ to 4 minutes, the surface is highly lustrous and of a good white and shows a reflectance of 87.

EXAMPLE 2

A frit was prepared as in Example 1 from the following ingredients (parts by weight):

*Ingredients of raw batch (parts by weight)*

| | |
|---|---|
| Pyrophyllite | 36.02 |
| Aluminum hydrate | 4.53 |
| Milled zircon | 12.31 |
| Limestone | 8.84 |
| Anhydrous borax | 24.57 |
| Soda nitre | 3.50 |
| Cryolite | 14.00 |
| Fluorspar | 5.00 |
| Zinc oxide | 5.00 |
| Raw total | 113.77 |

A slip was formed from this frit as in Example 1 and fired as in Example 1. The surface shows a reflectance of 87.

This batch required about 30% less time to smelt and produced an enamel of better working properties than Example 1.

EXAMPLE 3

To show the effect of decreasing the zirconium content to too great an extent, the following example was prepared. A frit was prepared as in Example 1 from the following ingredients (parts by weight):

*Ingredients of raw batch (parts by weight)*

| | |
|---|---|
| Pyrophyllite | 48.35 |
| Quartz | 2.01 |
| Milled zircon | 1.54 |
| Limestone | 8.84 |
| Anhydrous borax | 24.57 |
| Sodium nitrate | 3.50 |
| Cryolite | 14.00 |
| Fluorspar | 5.00 |
| Zinc oxide | 5.00 |

A slip was formed from this frit as in Example 1 and fired as in Example 1. The surface shows a reflectance of 73¼.

EXAMPLES 4-11

The following examples were prepared by mixing the raw ingredients as shown by Table II, below, and smelting at a temperature of 2000° to 2100° F. until a melt forming smooth strings results.

TABLE II

*Parts by weight*

|  | Examples | | | |
|---|---|---|---|---|
|  | 4 | 5 | 6 | 7 |
| Dehydrated borax | 224.5 | 221.7 | 136.3 | 219.7 |
| Sodium fluosilicate | 116.9 | 115.3 | 109.3 | 114.3 |
| Fluorspar | 58.3 | 57.5 | 54.4 | 57.0 |
| Zinc oxide |  |  | 25.2 | 26.4 |
| Amblygonite | 19.4 | 19.2 | 18.1 | 19.0 |
| Sodium nitrate | 24.3 | 24.0 | 22.7 | 23.8 |
| Zircon | 86.0 | 63.5 |  | 146.2 |
| Pyrophyllite |  |  |  | 366.0 |
| Aluminum hydrate |  |  |  | 27.8 |
| Zinc zirconium silicate | 88.5 |  |  |  |
| Special opacifier [1] |  |  | 161.1 |  |
| Quartz powder | 217.4 | 182.0 | 121.4 |  |
| Boric acid |  |  | 90.2 |  |
| Zirconium spinel |  | 136.8 |  |  |
| Sillimanite | 164.6 |  |  |  |
| Andalusite |  | 180.0 |  |  |
| English china clay |  |  | 261.3 |  |

|  | Examples | | | |
|---|---|---|---|---|
|  | 8 | 9 | 10 | 11 |
| Dehydrated borax | 219.7 | 134.6 | 221.0 | 222.3 |
| Sodium fluosilicate | 114.3 | 109.6 | 114.9 | 115.7 |
| Fluorspar | 57.0 | 54.6 | 57.3 | 57.7 |
| Zinc oxide |  | 25.3 | 26.5 |  |
| Amblygonite | 19.0 | 18.2 | 19.1 | 19.2 |
| Sodium nitrate | 23.8 | 22.8 | 23.9 | 24.1 |
| Zircon | 86.1 |  |  | 63.6 |
| Pyrophyllite | 366.0 | 350.7 | 440.1 | 334.5 |
| Aluminum hydrate | 27.8 | 26.6 | 1.7 |  |
| Zinc zirconium silicate | 86.5 |  |  |  |
| Special opacifier [1] |  | 164.5 |  |  |
| Zirconium oxide |  |  | 95.5 |  |
| Quartz powder |  |  |  | 25.8 |
| Boric acid |  | 93.1 |  |  |
| Zirconium spinel |  |  |  | 137.1 |

[1] This product is a zirconium opacifier produced in accordance with U. S. Patent No. 1,789,311.

100 parts of each of these frits were each milled with 6 parts of enameler's clay, 6 parts of zirconium oxide, 0.1 part of NaNO₂, and 38 parts of water to a fineness of +200 mesh. The slip thus formed was applied by spraying to sheet iron, previously supplied with a ground coat, at the rate of 72 grams per sq. ft. for two coats. After firing at 1500° F. for 2½ to 4 minutes, the surfaces are highly lustrous and of a good cream white in color, and show reflectances as follows:

TABLE III

|  | Examples | | | | | | | |
|---|---|---|---|---|---|---|---|---|
|  | 4 | 5 | 6 | 7 | 8 | 9 | 10 | 11 |
| Reflectance | 84.0 | 87.1 | 84.0 | 84.9 | 84.7 | 86.0 | 84.5 | 83.9 |

The frits in the above examples showed calculated percentage compositions, exclusive of impurities, according to the following table:

TABLE IV

|  | Examples | | | |
|---|---|---|---|---|
|  | 1 | 2 | 3 | 4-11 |
|  | Per cent | Per cent | Per cent | Per cent |
| Na | 11.01 | 10.69 | 10.68 | 8.90 |
| Ca | 5.44 | 5.85 | 5.85 | 3.05 |
| B | 5.99 | 5.06 | 5.05 | 4.95 |
| Al | 8.64 | 7.61 | 7.61 | 6.11 |
| Si | 13.60 | 13.36 | 16.54 | 16.92 |
| Zr | 7.02 | 6.98 | .87 | 7.35 |
| Zn |  | 3.85 | 3.85 | 2.21 |
| O | 39.85 | 37.18 | 40.16 | 39.80 |
| F | 8.45 | 9.42 | 9.40 | 10.18 |
| Li |  |  |  | .05 |
| P |  |  |  | .48 |

Although the above description and examples deal with the compounding of frits for enameling on metal bases, the present enameling compositions are also suitable for glazing ceramic bodies with equally promising results. It has also been found that similar compositions, with appropriate modifications, can be made up as glasses of various shapes, such as jars, table ware, sheets, etc. and by proper annealing, as is well understood in the art, will produce any desired translucency to dense opacity as desired by proper regulation of the amount of zirconium compound additions to the batch. In the case of using these compositions for glazing ceramic bases, or for making up as glasses, it is understood that the preferred quantities of materials other than aluminum, zirconium and fluorine (which are the ingredients necessary to secure opacity) may be varied to secure characteristics desired for these uses.

There are, also, other additions which may be added by skilled operators to produce certain specific effects well known in the art which are not concerned with the opacity derived from zirconium and should be considered as within the scope of this invention. Thus antimony might be added in small amounts to improve the acid resistance, color oxides may be added to obtain various color effects, strontium compounds to improve brilliance and workability, etc.

As many variations are possible within the scope of this invention, it is not intended to be limited except as defined by the appended claims.

We claim:

1. A composition capable, upon smelting, of forming a relatively translucent frit, in turn capable of producing highly opaque enamels and the like, comprising a mixture of compounds containing approximately the following content by analysis: sodium about 11%; calcium about 6%; boron about 5%; aluminum about 8%; silicon about 13%; zirconium about 7%; zinc about 4%; oxygen about 37%; and fluorine about 9%.

2. A composition capable, upon smelting, of forming a relatively translucent frit, in turn capable of producing highly opaque enamels and the like, comprising a mixture of compounds containing approximately the following content by analysis: sodium about 10.69%; calcium about 5.85%; boron about 5.06%; aluminum about 7.61%; silicon about 13.36%; zirconium about 6.98%; zinc about 3.85%; oxygen about 37.18%; and fluorine 9.42%.

3. A composition capable, upon smelting, of forming a relatively translucent frit, in turn capable of producing highly opaque enamels and the like, comprising a mixture of compounds containing approximately the following ingredients substantially in parts by weight, viz: zirconium oxide 8.00; quartz powder 30.42; dehydrated borax 28.91; sodium nitrate 3.23; fluorspar 5.00; limestone 7.68; cryolite 12.00; and aluminum hydrate 21.53.

4. A composition capable, upon smelting, of forming a relatively translucent frit, in turn capable of producing highly opaque enamels and the like, comprising a mixture of compounds containing approximately the following ingredients substantially in parts by weight, viz: pyrophyllite 36.02; aluminum hydrate 4.53; milled zirconium silicate (zircon) 12.31; limestone 8.84; anhydrous borax 24.57; sodium nitrate 3.50; cryolite 14.00; fluorspar 5.00; and zinc oxide 5.00.

5. A composition capable, upon smelting, of forming a relatively translucent frit, in turn capable of producing highly opaque enamels and the like, comprising a mixture of compounds containing approximately the following ingredients substantially in parts by weight, viz: pyrophyllite 48.35; quartz 2.01; milled zirconium silicate (zircon) 1.54; limestone 8.84; anhydrous borax 24.57; sodium nitrate 3.50; cryolite 14.00; fluorspar 5.00; and zinc oxide 5.00.

6. A composition capable, upon smelting, of forming a relatively translucent frit, in turn capable of producing highly opaque enamels and the like, comprising pyrophyllite, a zirconium compound, and a fluorine compound.

7. A composition capable, upon smelting, of forming a relatively translucent frit, in turn capable of producing highly opaque enamels and the like, comprising pyrophyllite, zirconium silicate, and a fluorine compound.

8. A composition capable, upon smelting, of forming a relatively translucent frit, in turn capable of producing highly opaque enamels and the like, comprising pyrophyllite, zirconium silicate, and a fluorine compound, the amount of pyrophyllite being in excess of that of zirconium silicate.

LEON J. FROST.
CHARLES H. COMMONS, Jr.